United States Patent [19]

Moradi-Araghi

[11] Patent Number: 4,994,194

[45] Date of Patent: Feb. 19, 1991

[54] ALTERING HIGH TEMPERATURE SUBTERRANEAN FORMATION PERMEABILITY

[75] Inventor: Ahmad Moradi-Araghi, Bartlesville, Okla.

[73] Assignee: Phillips Petroleum Company, Bartlesville, Okla.

[21] Appl. No.: 516,197

[22] Filed: Apr. 30, 1990

Related U.S. Application Data

[62] Division of Ser. No. 329,862, Mar. 29, 1989, Pat. No. 4,934,456.

[51] Int. Cl.$^5$ .............................................. C09K 7/00
[52] U.S. Cl. .................................... 252/8.551; 166/270
[58] Field of Search .............. 252/8.551, 340, 344, 252/315.3; 166/270

[56] References Cited

U.S. PATENT DOCUMENTS

| 3,574,820 | 4/1971 | Johnson et al. | 424/22 |
| 4,167,500 | 9/1979 | Jazenski et al. | 522/92 |
| 4,246,124 | 1/1981 | Swanson | 252/8.551 |
| 4,389,320 | 6/1983 | Clampitt | 252/8.551 |
| 4,440,228 | 4/1984 | Swanson | 166/274 |
| 4,450,123 | 5/1984 | Egawa et al. | 264/4.7 |
| 4,601,968 | 7/1986 | Hyosu | 430/137 |
| 4,612,008 | 9/1986 | Wong et al. | 604/892 |

*Primary Examiner*—Robert L. Stoll
*Assistant Examiner*—Greg M. Sweet
*Attorney, Agent, or Firm*—Laney, Dougherty, Hessin & Beavers

[57] ABSTRACT

A method and composition for altering the permeability of a high temperature subterranean formation are provided. The composition of the invention is comprised of water, at least one water dispersible acrylamide containing polymer, and a water dispersible crosslinker for bringing about the delayed crosslinking of the polymer comprised of the combination of an aldehyde and a salicylic acid derivative.

14 Claims, No Drawings

ALTERING HIGH TEMPERATURE SUBTERRANEAN FORMATION PERMEABILITY

This is a divisional of copending application Ser. No. 07/329,862 filed on 3/29/89, now U.S. Pat. No. 4,834,456.

BACKGROUND OF THE INVENTION

1. Field Of The Invention

The present invention relates generally to methods and compositions for altering the permeability of high temperature subterranean formations, and more particularly, to methods and compositions for delayedly forming in situ gels at high temperatures in producing formations subjected to enhanced production procedures.

2. Description of the Prior Art

Undesirable water recovered from oil wells can result from the infiltration of naturally occurring subterranean water or, in the case of waterflooding or steam flooding operations, from the injected drive water or steam. In both cases, water or steam flows through zones of high permeability to the producing well bores whereby oil in less permeable zones is bypassed. In water or steam flooding operations, the more permeable zones of subterranean formations tend to take most of the injected flood water or steam. While this is acceptable initially when the oil contained in the high permeability zones is being swept therefrom, it subsequently becomes undesirable as the oil in such zones becomes depleted. From that point on, the water or steam flood provides little benefit in enhancing oil production.

Methods and compositions for accomplishing near well and in depth plugging of high permeability zones by forming gels therein have heretofore been developed and used. The formation of the gels causes high permeability zones to be plugged or at least lowered in permeability whereby subsequently injected flood water or steam is caused to enter previously bypassed zones. This in turn causes the flood water or steam to mobilize increased amounts of oil which are recovered from the subterranean formation.

A variety of methods and polymer compositions which gel in situ to reduce the permeability of high permeability zones in subterranean formations have been utilized successfully. U.S. Pat. No. 3,762,476 issued on Oct. 2, 1973 discloses a method of reducing recovered water from a subterranean formation wherein aqueous polymer solutions interspaced with aqueous solutions of crosslinking metallic ions are injected into the formation. A variety of polymers can be utilized in conjunction with various multivalent metal cations complexed with sequestering agents. The solution containing the crosslinking complex is injected after the first polymer solution injection, followed by injection of further polymer solution, etc.

U.S. Pat. No. 4,569,393 issued on Feb. 11, 1986 discloses a water permeability correction process to improve the sweep efficiency of waterflooding which involves the sequential injection of a solution containing a sequestered polyvalent metal cation, such as aluminum citrate, and a polymer solution containing a gelable polymer, such as polyacrylamide, followed by the injection of carbon dioxide to decrease the pH of the polymer which activates the delayed in situ gelation thereof. The field applications of this method and the method described in U.S. Pat. No. 3,762,476 are restricted to fields having an available fresh water supply because the crosslinking metal ion complexes and/or the gelation activators are incompatible with hard brines.

U.S. Pat. No. 4,683,949 issued on Aug. 4, 1987 describes a permeability correction process using a gel comprised of a polyacrylamide polymer and a chromium (III) acetate gelling agent capable of crosslinking the polymer in an aqueous solvent.

While the above-described methods and compositions as well as other methods and compositions have been utilized successfully for improving the sweep efficiency of water or steam flooding and/or reducing the production of naturally occurring formation waters, such methods and compositions have generally been unsuccessful in applications requiring the formation of gels deep in high permeability zones having high temperatures, i.e., temperatures above about 160° F. At such temperatures, the heretofore used crosslinking metal cation complexes often very quickly break down and crosslink the polymers used prior to penetrating into the formation to the in-depth location required.

U.S. Pat. No. 4,799,548 issued on Jan. 24, 1989 discloses two crosslinkers with differing temperature responsive crosslinking characteristics used to gel water soluble polymers for diverting steam in steam stimulation operations carried out in heavy crude oil wells. The high temperature crosslinking agents disclosed are comprised of combinations of phenolic compounds and aldehydes, and are generally suitable for altering the permeability of subterranean formations having temperatures of 175° F. and above.

By the present invention improved methods and compositions for altering subterranean formation permeability which are effective at temperatures of 150° F. and above are provided. The crosslinkers utilized in accordance with the methods and compositions provide longer delays in crosslinking whereby the compositions can be placed deeper in high temperature subterranean formations, and they generally have lower toxicity levels than prior art crosslinkers making them and the compositions in which they are used more compatible with the environment.

SUMMARY OF THE INVENTION

By the present invention, methods and compositions for altering the permeability of high temperature subterranean formations are provided. The compositions are effective in forming gels and reducing permeability in formations having temperatures in the range of from about 150° F. to about 300° F. While the compositions can be utilized for both near well and in-depth treatments, they are particularly suitable for reducing permeability of high temperature formations at in-depth locations, i.e., at locations long distances from the composition injection points. The compositions of the invention ar comprised of water, at least one water dispersible acrylamide containing polymer, and a water dispersible crosslinker for bringing about the delayed crosslinking of the polymer and the corresponding gelation of the composition comprised of the combination of an aldehyde and a salicylic acid derivative selected from salicylamide and acetylsalicylic acid.

In accordance with the methods of the invention for altering the permeability of a high temperature subterranean formation, a composition of the invention is injected into the formation by way of a penetrating well bore. The composition can then be displaced into zones of high permeability long distances from the well bore. Once within the zones of high permeability, the delayed crosslinker in the composition crosslinks the polymer therein which in turn causes the gelation of the composition and the reduction in permeability of the zones.

It is, therefore, a general object of the present invention to provide methods and compositions for altering high temperature subterranean formation permeability.

A further object of the present invention is the provision of methods and compositions for changing the near well or in-depth permeability of zones in subterranean formations having temperatures in the range of from about 150° F. to about 300° F.

It is a further object of the present invention to provide crosslinkers for use in aqueous polymer compositions which have excellent stability at temperatures in the range of from about 150F. to about 300° F., and which have relatively low toxicity.

Other and further objects, features and advantages of the present invention will be readily apparent to those skilled in the art upon a reading of the description of preferred embodiments which follows.

DESCRIPTION OF PREFERRED EMBODIMENTS

By the present invention, delayed gelable compositions for altering the permeability of subterranean formations are provided. The compositions can be formed using any readily available water including oilfield brines and seawater, and can be utilized to form gels at locations in deep hot subterranean formations. The compositions can be utilized to delayedly form gels in such formations at locations which are near to the well bores penetrating the formations or far from the well bores. The compositions are particularly suitable for forming gels at locations which are long distances from their points of injection.

Methods are provided which employ the compositions for altering subterranean formation permeability at formation temperatures in the range of from about 150° F. to about 300° F. In accordance with the methods, an effective quantity of a single aqueous composition containing effective amounts of a gelable acrylamide containing polymer and a crosslinker comprised of the combination of an aldehyde and a salicylic acid derivative is injected into the formation. The injection of the composition can optionally be preceded by the injection of a preflush solution, and is followed by the injection of a volume of water effective to move the composition to a desired location in the formation.

The delayed gelable compositions of this invention for altering the permeability of high temperature subterranean formations are comprised of water, at least one water dispersible acrylamide containing polymer, and a water dispersible crosslinker for bringing about the delayed crosslinking of the polymer and the gelation of the composition comprised of the combination of an aldehyde and a salicylic acid derivative selected from salicylamide and acetylsalicylic acid. The term "water dispersible" is used herein to mean components which are truly water soluble as well as components which are dispersible in water whereby suspensions thereof can be formed.

A variety of water dispersible acrylamide containing polymers capable of being gelled when contacted with cross-linkers comprised of aldehydes and the abovementioned salicylic acid derivatives can be utilized. Suitable such polymers are homopolymers of acrylamide monomers, and copolymers of such a monomer with any ethylenically unsaturated monomer from the group consisting of acrylic acid, methacrylic acid, vinyl sulfonic acid, vinyl benzyl sulfonic acid, vinyl acetate, acrylonitrile, methyl acrylonitrile, vinyl alkyl ether, vinyl chloride, maleic anhydride, vinyl substituted cationic quaternary ammonium compounds, 2-acrylamido-2methylpropane sulfonic acid, sodium 2-acrylamido-2-methylpropane sulfonate, and vinyl pyrrolidone.

Particularly preferred acrylamide containing polymers for use in accordance with the present invention can be selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of vinyl pyrrolidone, acrylamide, and sodium 2-acrylamido-2-methylpropane sulfonate, and copolymers of acrylamide and sodium 2-acrylamido-2-methylpropane sulfonate. The relative ratios of the monomers are not critical to the practice of the present invention. However, specific preferred polymers include a 60:40 weight percent copolymer of vinyl pyrrolidone and acrylamide; a 50:50 weight percent copolymer of vinyl pyrrolidone and acrylamide; a 30:15:55 weight percent terpolymer of vinyl pyrrolidone, acrylamide and sodium 2-acrylamido-2-methylpropane sulfonate; a 40:60 weight percent copolymer of acrylamide and sodium 2-acrylamido-2methylpropane sulfonate; and homopolymers of acrylamide wherein not more than 40% cf the carboxyamide groups are hydrolyzed.

The polymers used in the compositions of this invention can take any suitable form such as gel-log (a semisolid containing about 50 to about 75 weight percent water), a powder, a solution, an inverse water-in-oil emulsion, etc. The molecular weights of the polymers are not critical; however, it is preferred that the polymers have a molecular weight between 100,000 and 20,000,000. The upper limit of molecular weight is unimportant so long as the polymers are still water dispersible and can be pumped.

The acrylamide containing polymer used is generally present in the composition in the amount of from about 0.05% to about 5.0% by weight, preferably from about 0.25% to about 2.0% by weight. The concentration of polymer in the composition depends to some degree on the molecular weight of the polymer. A high molecular weight results in a higher viscosity of the resulting gel for a particular concentration of polymer. The term "% by weight" is used herein to mean the weight percentage of a component in the composition based on the total weight of all of the components in the composition.

The manner in which the polymer is polymerized is not critical to the practice of the present invention. Polymerization can be initiated by chemicals, radiation or any other technique known to those skilled in the art. In addition, any suitable method can be employed for preparing the aqueous compositions of this invention. However, it is preferred that the polymer be dispersed in water before combining the other components therewith.

The crosslinkers utilized in the compositions of this invention are combinations of aldehydes and salicylic acid derivatives selected from salicylamide and acetylsalicylic acid. Such a combination crosslinker is stable in an aqueous polymer containing composition at high temperatures and after a relatively long delay, i.e., from days to weeks depending upon the particular salicylic acid derivative used and other factors, crosslinks the polymer and causes the aqueous composition containing the polymer and crosslinker to gel.

Any water dispersible aldehyde can be utilized. Thus, suitable aldehydes can be selected from the group consisting of aliphatic monoaldehydes, aromatic monoaldehydes, aliphatic dialdehydes and aromatic dialdehydes. Preferred aldehydes can be selected from the group consisting of acetaldehyde, butyraldehyde, isobutyraldehyde, heptaldehyde, decanal, glyoxal, glutaraldehyde, terephthaldehyde, formaldehyde, and formaldehyde precursors such as paraformaldehyde. Formaldehyde is presently preferred due to its effectiveness, availability and relatively low cost.

The aldehyde utilized is generally present in the composition in an amount in the range of from about 0.02% to about 2.0% by weight, most preferably in an amount of about 0.05% to about 1.0% by weight. The salicylic acid derivative selected from salicylamide and acetylsalicylic acid associated with the aldehyde is present in an amount of from about 0.02% to about 2.0% by weight, most preferably from about 0.05% to about 1.0% by weight. The preferred salicylic acid derivatives are acetylsalicylic acid and salicylamide.

The crosslinker of the present invention can be conveniently prepared in advance, i.e., an aqueous solution made up to a convenient concentration can be prepared for subsequent use in preparing the gelable compositions of the invention. Generally, the weight ratio of the aldehyde to the salicylic acid derivative varies over the broad range of from about 1:20 to about 20:1, preferably from about 1:5 to about 5:1.

A particularly preferred gelable composition of the invention for altering the permeability of a high temperature subterranean formation, i.e., a formation having a temperature in the range of from about 150° F. to about 300° F., is comprised of water, a 30:15:55 weight percent terpolymer of vinyl pyrrolidone, acrylamide and sodium 2-acrylamido-2-methylpropane sulfonate present in the composition in an amount in the range of from about 0.25% to about 2.0% by weight, and a crosslinker comprised of a combination of formaldehyde and salicylic acid derivative selected from salicylamide and acetylsalicylic acid, the formaldehyde being present in the composition in an amount in the range of from about 0.05% to about 1.0% by weight and the salicylic acid derivative being present therein in an amount in the range of from about 0.05% to about 1.0% by weight.

In carrying out the method of the invention for altering the in depth permeability of a high temperature subterranean formation, a delayed gelable composition is prepared and injected by way of a well bore penetrating the formation to a desired zone in the formation which is to be altered in permeability. Generally, a quantity of gelable composition from about 100% to about 120% of the pore volume of the zone to be treated is utilized. The total amount of the combination crosslinker components used in the composition depends on the amount of polymer in the composition. Such amount is generally from about 10% to about 100% by weight of polymer utilized. Once located in the zone of a subterranean formation which is to be reduced in water permeability, the gelable composition is allowed to gel.

The crosslinkers of the invention have stability in aqueous solutions at high temperatures and do not crosslink the acrylamide containing polymer in the composition for long periods of time, e.g., from 5 days to 5 weeks depending upon temperature, salinity, the particular quantity and type of salicylic acid derivative utilized and other factors. The term "stability" is used herein to mean that the crosslinker does not react with the acrylamide containing polymer or lose its ability to crosslink the polymer for a long period of time at the high temperatures involved. The resulting delay allows an aqueous polymer composition containing the crosslinker to be transported a long distance in a subterranean formation without prematurely crosslinking the polymer or otherwise becoming ineffective.

In order to further illustrate the present invention, the following examples are given.

EXAMPLE 1

A gelable composition of the present invention was prepared including a delayed crosslinker comprised of formaldehyde and salicylamide. More specifically, 1.0 percent by weight of a thermally stable 301555 weight percent terpolymer of N-vinyl pyrrolidone, acrylamide and sodium 2-acrylamido-2-methylpropane sulfonate was dissolved in synthetic sea water, i.e., an aqueous solution containing 33,756 ppm total dissolved salts, including 437 ppm calcium and 1,256 ppm magnesium. A combination formaldehyde-salicylamide delayed crosslinker was combined with the polymer solution. i.e., after being combined the polymer solution contained about 1,000 ppm formaldehyde and about 1,000 ppm salicylamide. The resultant delayed gelable composition was used in gelation aging tests at 250° F.

The gelation aging tests were performed in glass ampules (2.2 cm diameter by 22.5 cm length) containing 20 milliliters of the gelable composition. Air in each ampule was replaced with nitrogen without removing dissolved oxygen from the composition to simulate field conditions. Each ampule was then torch sealed under a slight vacuum and placed vertically in a compartmented aluminum box. The box containing the ampules was then placed in an oven wherein the ampules were aged at a temperature of 250° F.

The ampules were periodically removed from the oven and checked for gelation. As crosslinking developed, small microgels or granules began to appear, i.e., a very slight gel formed. Continued growth of the microgels to globule occurred next, referred to as slight gel. Larger gel masses next appeared, referred to as partial gel, followed by the development of stronger gels with measurable tongue lengths. The tongue lengths were measured by placing each ampule horizontally while hot behind a shield for safety, allowing the gelling composition to move to its equilibrium position and then measuring the length of the tongue formed. As gelation progressed with time, stronger gels and shorter tongue lengths were developed. The results of these tests are shown in Table I below.

TABLE I

| Gelation of Polymer Composition Including Formaldehyde and Salicylamide Crosslinker | |
|---|---|
| Aging Time | Tongue Length, cm. |
| 1.5 hrs. | No Gel |
| 3.3 hrs. | No Gel |
| 8.0 hrs. | No Gel |
| 1.4 days | No Gel |
| 2.0 days | No Gel |
| 3.4 days | No Gel |
| 6.0 days | No Gel |
| 8.0 days | No Gel |
| 11 days | No Gel |
| 13 days | No Gel |

TABLE I-continued

Gelation of Polymer Composition Including Formaldehyde and Salicylamide Crosslinker

| Aging Time | Tongue Length, cm. |
|---|---|
| 15 days | No Gel |
| 19 days | No Gel |
| 21 days | No Gel |
| 23 days | No Gel |
| 34 days | Thick |
| 40 days | 5.8 |
| 54 days | 2.2 |
| 61 days | 5.2 |
| 70 days | 5.0 |
| 79 days | 5.5 |
| 83 days | 4.7 |
| 100 days | 5.4 |
| 107 days | 4.8 |
| 121 days | 5.3 |
| 127 days | 4.0 |
| 159 days | 0.5 |
| 195 days | 1.1 |
| 259 days | 2.2 |
| 315 days | 2.3 |
| 351 days | 4.9 |
| 476 days | 3.2 |
| 561 days | 1.4 |
| 601 days | 11.0[1] |
| 672 days | 10.5[1] |
| 699 days | 10.4[1] |

[1]Entire gel length measured instead of just tongue length.

EXAMPLE 2

For comparison purposes, a composition was prepared identical to the gelable composition of Example 1 except that phenol was substituted for the salicylamide. Identical gelation aging tests were then performed using the phenol containing composition. The results of these tests are given in Table II below.

TABLE II

Gelation of Polymer Composition Including Formaldehyde and Phenol Crosslinker

| Aging Time | Tongue Length, cm |
|---|---|
| 1.0 hr. | No Gel |
| 2.0 hrs. | No Gel |
| 3.0 hrs. | No Gel |
| 8.2 hrs. | No Gel |
| 19.2 hrs. | 3.7 |
| 1.8 days | 1.7 |
| 3.8 days | 1.2 |
| 5.8 days | 1.0 |
| 8.8 days | 1.0 |
| 12 days | 0.7 |
| 19 days | 1.4 |
| 35 days | 1.8 |
| 49 days | 8.6 |
| 65 days | 10.3 |
| 72 days | 11.0 |
| 86 days | 12.0 |
| 92 days | 11.7 |
| 114 days | 11.6 |
| 124 days | 12.1 |
| 160 days | 14.5[1] |
| 174 days | 14.1[1] |
| 224 days | 14.8[1] |
| 280 days | 14.5[1] |
| 316 days | 14.2[1] |
| 363 days | 3.0 + 0.2 H$_2$O[2] |

[1]Entire gel length measured instead of just tongue length.
[2]Gel length + height of separated syneresis water.

From Tables I and II above it can be seen that the delayed gelable composition of the present invention took more than five weeks of aging to produce a gel with a measurable tongue length while the composition including a formaldehyde-phenol crosslinker produced a measurable tongue length within a day of aging.

EXAMPLE 3

A gelable composition was prepared comprised of 0.7% by weight of a 30:15:55 weight percent terpolymer of vinyl pyrrolidone, acrylamide and sodium 2-acrylamido-2-methylpropane sulfonate in synthetic sea water containing 2,000 ppm of formaldehyde and 2,000 ppm of acetylsalicylic acid. Gelation aging tests were conducted in accordance with the procedure described in Example 1 at three different temperatures, i.e., at 200° F., 250° F. and 300° F. The results of these tests are shown in Table III.

TABLE III

Gelation of Polymer Composition Including Formaldehyde and Acetylsalicylic Acid Crosslinker

| | GELABLE COMPOSITION TEMPERATURE | | |
|---|---|---|---|
| Aging Time | 200° F. | 250° F. | 300° F. |
| 1 hr. | Very Slight Gel | Very Slight Gel | Very Thick |
| 2 hrs. | Very Slight Gel | Very Slight Gel | Very Thick |
| 3 hrs. | Very Slight Gel | Very Slight Gel | Very Thick |
| 4 hrs. | Very Slight Gel | Very Slight Gel | Very Thick |
| 5 hrs. | Very Slight Gel | Very Slight Gel | Very Thick |
| 9.8 hrs. | Thick | Thick | Thick |
| 21.6 hrs. | Very Thick | Thick | Thick |
| 1.25 days | Thick | Thick | Thick |
| 2.23 days | Thick | Thick | 10.2 |
| 2.85 days | Thick | Thick | 4.5 |
| 3.85 days | Very Thick | Very Slight Gel | 4.8 |
| 4.85 days | Very Thick | Very Slight Gel | 9.5 |
| 5.87 days | Very Thick | Slight Gel | 10.5[1] |
| 6.85 days | Very Slight Gel | Slight to Partial Gel | 10.6 + 0.1[2] |
| 9.88 days | Very Slight Gel | 11.0 | 10.5 + 0.3[2] |
| 18.0 days | Very Slight Gel | 9.6 | 9.0 + 0.7[2] |
| 24.1 days | Slight to Partial Gel | 11.0[1] | 8.6 + 1.2[2] |
| 31.0 days | Partial Gel | 10.5 + 0.2[2] | 8.3 + 1.2[2] |
| 59.0 days | Partial Gel | 9.0 | 7.3 + 1.6[2] |
| 89.0 days | 3.5 | 8.2 + 1.0[2] | 7.0 + 1.8[2] |
| 153 days | 9.4 | 7.2 + 1.2[2] | 6.6 + 2.0[2] |
| 193 days | 10.0[1] | 7.0 + 1.5[2] | 6.8 + 2.0[2] |
| 229 days | 9.0 + 0.3[2] | 6.7 + 1.5[2] | 6.7 + 2.0[2] |
| 269 days | 8.4 + 0.6[2] | 6.6 + 1.5[2] | 6.7 + 2.0[2] |
| 306 days | 8.2 + 0.8[2] | 6.5 + 1.5[2] | 7.1 + 2.2[2] |
| 376 days | 7.4 + 1.0[2] | 6.3 + 1.5[2] | 7.4 + 2.2[2] |

[1]Entire gel length measured instead of just tongue length.
[2]Gel length + height of separated syneresis water.

EXAMPLE 4

For comparison purposes, a gelable polymer composition was prepared identical to the composition described in Example 3 except phenol was substituted for the acetylsalicylic acid. Gelation aging tests were performed in accordance with the procedure described in Example 3. The results of these tests are given in Table IV below.

TABLE IV

Gelation of Polymer Composition Including Formaldehyde and Phenol Crosslinker

| | GELABLE COMPOSITION TEMPERATURE | | |
|---|---|---|---|
| Aging Time | 200° F. | 250° F. | 300° F. |
| 1.1 hrs. | Very Slight Gel | Very Thick | Thick |
| 2.1 hrs. | Very Slight Gel | Thick | Very Slight Gel |
| 3.5 hrs. | Thick | Thick | 19.0 |
| 7.0 hrs. | Thick | 19.6 | 13.3 |
| 18.8 hrs. | Very Slight Gel | 6.2 | 9.5 |
| 21.6 hrs. | Very Slight Gel | 13.5 | 5.0 |
| 1.0 days | Very Slight Gel | 14.0 | 4.6 |
| 1.1 days | Very Slight Gel | 14.6 | 5.0 |
| 1.8 days | 15.6 | 10.6 | 3.2 |
| 2.1 days | 16.0 | 12.2 | 2.8 |

TABLE IV-continued

Gelation of Polymer Composition Including
Formaldehyde and Phenol Crosslinker

| Aging Time | GELABLE COMPOSITION TEMPERATURE | | |
|---|---|---|---|
| | 200° F. | 250° F. | 300° F. |
| 2.8 days | 15.2 | 9.5 | 2.6 |
| 3.1 days | 14.8 | 7.7 | 0.9 |
| 4.0 days | 11.8 | 7.0 | 2.2 |
| 6.9 days | 5.5 | 4.3 | 0.9 |
| 8.1 days | 7.0 | 6.0 | 1.0 |
| 8.8 days | 7.6 | 7.5 | 1.0 |
| 9.9 days | 7.5 | 5.9 | 0.8 |
| 14 days | 9.5 | 3.4 | 0.7 |
| 22 days | 9.0 | 3.2 | 4.0 |
| 28 days | 10.5 | 2.2 | $11.7 + 0.2^2$ |
| 35 days | 11.5 | 2.6 | $11.5 + 0.3^2$ |
| 63 days | 10.8 | 2.5 | $9.2 + 1.0^2$ |
| 93 days | 11.4 | 3.5 | $9.4 + 1.5^2$ |
| 157 days | — | 6.0 | $8.3 + 1.5^2$ |
| 197 days | 12.5 | 6.5 | $8.8 + 1.5^2$ |
| 233 days | 13.5 | 7.2 | $9.0 + 1.5^2$ |
| 265 days | $12.6^1$ | 6.5 | $9.3 + 1.5^2$ |
| 303 days | $17.0^1$ | 9.7 | $9.3 + 1.5^2$ |
| 379 days | $14.4 + 0.1^2$ | 8.5 | $10.8 + 1.6^2$ |

[1] Entire gel length measured instead of just tongue length.
[2] Gel length + height of separated syneresis water.

A comparison of Tables III and IV shows that acetylsalicylic acid in combination with formaldehyde crosslinked the polymer at a much slower rate than formaldehyde and phenol. For example, the formaldehyde-phenol crosslinker produced a gel with measurable tongue length within 7 hours of aging at 250° F. The formaldehyde-acetylsalicylic acid required about one week of aging to produce a gel with measurable tongue length. As also shown in Tables III and IV, extended aging causes syneresis, i.e., expulsion of water from the gel structure. This is indicated by the measured height of the separated syneresis water. Even for the worst case of 2.2 centimeters of syneresis water (the gelable composition including formaldehyde-acetylsalicylic acid after 376 days) the extent of syneresis was only about 30%. Such syneresed bulk gels are still useful in permeability reduction in porous media.

The present invention, therefore, is well adapted to carry out the objects and attain the ends and advantages mentioned as well as those inherent therein. While presently preferred embodiments of the invention have been described for purposes of this disclosure, numerous changes may be made by those skilled in the art which are encompassed within the spirit of the invention as defined by the appended claims.

What is claimed is:

1. A delayed acrylamide containing polymer crosslinker having stability in an aqueous solution at high temperatures comprised of the combination of an aldehyde and a salicylic acid derivative selected from salicylamide and acetylsalicylic acid.

2. The crosslinker of claim 1 wherein said aldehyde is selected from the group consisting of acetaldehyde, butyraldehyde, isobutyraldehyde, heptaldehyde, decanal, glyoxal, glutaraldehyde, terephthaldehyde, formaldehyde and formaldehyde precursors such as paraformaldehyde.

3. The crosslinker of claim 2 wherein said weight ratio of said aldehyde to said salicylic acid derivative is in the range of from about 1:20 to about 20:1.

4. The crosslinker of claim 3 wherein said salicylic acid derivative is acetylsalicylic acid.

5. The crosslinker of claim 3 wherein said salicylic acid derivative is salicylamide.

6. A delayed gelable composition for altering the permeability of a high temperature subterranean formation comprising:
(a) water;
(b) at least one water dispersible acrylamide containing polymer; and
(c) a water dispersible crosslinker for bringing about the delayed crosslinking of said polymer and gelation of said composition comprised of the combination of an aldehyde and a salicylic acid derivative selected from salicylamide and acetylsalicylic acid.

7. The composition of claim 6 wherein said acrylamide containing polymer is selected from the group consisting of homopolymers of acrylamide, copolymers of acrylamide and vinyl pyrrolidone, homopolymers of methacrylamide, copolymers of acrylamide and methacrylamide, copolymers of acrylamide and acrylic acid, copolymers of methacrylamide and acrylic acid, terpolymers of vinyl pyrrolidone, acrylamide and sodium 2-acrylamido-2-methylpropane sulfonate, and copolymers of acrylamide and sodium 2-acrylamido-2-methylpropane sulfonate.

8. The composition of claim 7 wherein said acrylamide containing polymer is present in said composition in an amount in the range of from about 0.05% to about 5.0% by weight.

9. The composition of claim 6 wherein said aldehyde is selected from the group consisting of acetaldehyde, butyraldehyde, isobutyraldehyde, heptaldehyde, decanal, glyoxal, glutaraldehyde, terephthaldehyde, formaldehyde and formaldehyde precursors such as paraformaldehyde.

10. The composition of claim 9 wherein said aldehyde is present in said composition in an amount in the range of from about 0.02% to about 2.0% by weight.

11. The composition of claim 10 wherein said salicylic acid derivative is present in said composition in an amount in the range of from about 0.02% to about 2.0% by weight.

12. The composition of claim 6 wherein said polymer is a 30:15:55 weight percent terpolymer of vinyl pyrrolidone, acrylamide, and sodium 2-acrylamido-2-methylpropane sulfonate and is present in said composition in an amount in the range of from about 0.25% to about 2.0% by weight.

13. The composition of claim 12 wherein said aldehyde is formaldehyde and is present in said composition in an amount in the range of from about 0.05% to about 1.0% by weight.

14. The composition of claim 13 wherein said salicylic acid derivative is present in said composition in an amount in the range of from about 0.05% to about 1.0% by weight.

* * * * *